(12) United States Patent
Maynard et al.

(10) Patent No.: US 6,388,193 B2
(45) Date of Patent: May 14, 2002

(54) STACKABLE BEND RADIUS GUIDE

(75) Inventors: Charlie Maynard, Watertown; Derek Bobowick, Sandy Hook, both of CT (US)

(73) Assignee: The Siemon Company, Watertown, CT (US)

( * ) Notice: Subject to any disclaimer, the term of this patent is extended or adjusted under 35 U.S.C. 154(b) by 0 days.

(21) Appl. No.: 09/760,270

(22) Filed: Jan. 12, 2001

Related U.S. Application Data
(60) Provisional application No. 60/175,767, filed on Jan. 12, 2000.

(51) Int. Cl.$^7$ ................................................ G02B 6/00
(52) U.S. Cl. ........................ 174/59; 174/135; 385/134
(58) Field of Search ................. 174/659, 65 R, 174/151, 152 G, 153 G, 135, 101, 59; 248/56; 385/135, 134, 100; 312/286, 311, 223.1; 379/325, 326, 327, 328, 329, 330

(56) References Cited

U.S. PATENT DOCUMENTS

| | | | |
|---|---|---|---|
| 3,811,157 A | * | 5/1974 | Schenk ...................... 24/221 R |
| 4,007,516 A | * | 2/1977 | Coules ...................... 24/221 R |
| 5,509,100 A | * | 4/1996 | Garnett et al. .............. 385/100 |
| D387,652 S | | 12/1997 | Carlson, Jr. |
| 5,694,511 A | | 12/1997 | Pimpinella et al. |
| 5,758,004 A | | 5/1998 | Alarcon et al. |
| 5,806,140 A | * | 9/1998 | Carlson et al. ........... 174/65 G |
| 5,898,129 A | | 4/1999 | Ott et al. |
| 5,921,402 A | | 7/1999 | Magenheimer |
| 5,945,633 A | | 8/1999 | Ott et al. |
| 5,988,570 A | * | 11/1999 | Gretz ........................ 248/74.2 |
| 6,012,683 A | | 1/2000 | Howell |
| 6,023,024 A | | 2/2000 | Stjerneby |
| 6,049,040 A | * | 4/2000 | Biles et al. .................... 174/48 |
| 6,076,779 A | | 6/2000 | Johnson |
| 6,263,144 B1 | * | 6/2001 | Daoud ........................ 385/135 |
| 6,271,476 B1 | * | 8/2001 | Bobowick et al. .......... 174/135 |
| 6,310,294 B1 | * | 10/2001 | Di Girolamo et al. ...... 174/101 |

* cited by examiner

*Primary Examiner*—Dean A. Reichard
*Assistant Examiner*—Angel R. Estrada
(74) *Attorney, Agent, or Firm*—Cantor Colburn LLP

(57) ABSTRACT

A device for providing microbending and bend radius protection for cables in a cable distribution or management system. The device includes an arcuate member of radius greater than or equal to the minimum bend radius of a prescribed cable, a plurality of flanges disposed on the arcuate member perpendicular to the longitudinal axis of the arcuate member, a quarter turn fastener, an opening for receiving the quarter turn fastener, a plurality of protuberances, and a plurality of recesses for receiving the protuberances.

16 Claims, 6 Drawing Sheets

STACKABLE BEND RADIUS GUIDE

CROSS REFERENCE TO RELATED APPLICATIONS

This application claims the benefit of U.S. Provisional Patent Application Ser. No. 60/175,767 filed Jan. 12, 2000, the contents of which are incorporated herein by reference thereto.

FIELD OF THE INVENTION

The invention relates generally to cable management and, in particular, to a device for providing bend radius and microbending protection of cables entering, exiting, or contained within cable management and distribution systems.

BACKGROUND OF THE INVENTION

The use of fiber optical cable is limited in modem applications by a minimum bend radius and, further, by the incidence of microbending. A fiber cable bent beyond the minimum bend radius typically suffers signal degradation. Microbending occurs, for example, when a cable is pulled tight across a sharp corner or edge and results in high attenuation of the signal and can degrade or interrupt signal transmission.

Fiber optic cable that is brought into a building for use in transmitting coded or modulated signals, such as telephone (voice), cable (video), or computers (data) signals, must be distributed throughout the building to each location that requires access to the information being transmitted. To facilitate that distribution, enclosures, racks, connect panels, and channel systems are typically utilized to house and manage the dispersal of the fiber.

FIG. 1 shows an example of a distribution enclosure 10. Distribution enclosure 10 allows cables to enter and exit the enclosure at openings 12. In many cases, as many as seventy-two fibers are distributed within a single enclosure and several of these enclosures are attached to a rack. In larger systems, a room full of these racks serves as a central hub from which thousands of fibers are distributed.

The multitude of fibers entering and exiting distribution enclosures and other cable management devices and the proximity of hardware equipment to such devices results in a high incidence of microbending. Any fiber entering or exiting an enclosure can be subject to microbending by being pulled tight across a sharp edge or pinched between two pieces of hard plastic or sheet metal. A fiber contained within a cable management device is susceptible to bend radius breaches and microbending about parts within the management device.

FIG. 2 depicts a cable retainer 20 common in the art for managing the distribution of fiber cables in a cabling system. Cable retainer 20 includes a first loop 22 disposed adjacent to a second loop 24, both for retaining layers of cable. The cable retainer further includes a quarter turn fastener 26 for securing cable retainer 20 to a cable distribution enclosure, rack, or other device of a cable management system. Cable retainer 20 may be used in combination with a plurality of cable retainers 20 to direct the path of cable. The cable retainer, however, does not protect a cable against exceeding minimum bend radius nor against the occurrence of microbending.

FIG. 3 shows a perspective view of a cable guide 30. Cable guide 30 includes a semi-cylindrical member 32, a first member 34, and a second member 36. First member 34 and second member 36 are disposed at either end of semi-cylindrical member 32 perpendicular to the longitudinal axis of said member 32. First member 34 contains slots 35 for mounting the cable guide device to various cable distribution and management equipment. Cable guide 30 further includes a plurality of flanges 38 disposed on the semi-cylindrical member parallel to first and second members 34 and 36.

Cable guide 30, however, is not designed to protect cables retained thereby against the hazards of minimum bend radius violations.

Additionally, cable guide 30 does not provide for expansion of a cable system. That is, once installed, a user is limited to the surface area of the cable guide. If a cable management system expands requiring a number of cables in excess of that which can be supported by installed cable guides, the guides must be disassembled, larger guides acquired, and then the larger guides installed.

Moreover, cable guide 30 requires specific mounting hardware and the use of tools to install the guide in a cable management system.

The inflexibility and limitations of cable guide 30 result in inconvenience and inefficiency to a user.

Accordingly, it is desired to have a device for providing bend radius and microbending protection of cables entering, exiting, or contained within cable management and distribution systems.

SUMMARY OF THE INVENTION

The above discussed and other drawbacks and deficiencies of the prior art are overcome or alleviated by a stackable bend radius guide of the present invention. The stackable bend radius guide is an effective cable management device for preventing deleterious effects associated with microbending and minimum bend radius violations of fiber optical cables.

In one embodiment of the present invention, the device uses an arcuate surface and a plurality of guide flanges to direct fiber cables so as to prevent microbending and minimum bend radius violations within a cable management system. The device includes both a quarter turn fastener and an opening for receiving quarter turn fasteners. In this way one bend radius guide may mate with a plurality of bend radius guides combining to provide a bend surface area required for a particular cabling application. The quarter turn fastener further allows for ease of installation and disassembly by requiring no tools and no mounting or attachment hardware.

BRIEF DESCRIPTION OF THE DRAWINGS

Referring now to the drawings wherein like elements are numbered alike in the several FIGURES.

DESCRIPTION OF THE PREFFERRED EMBODIMENTS

Figure 1:
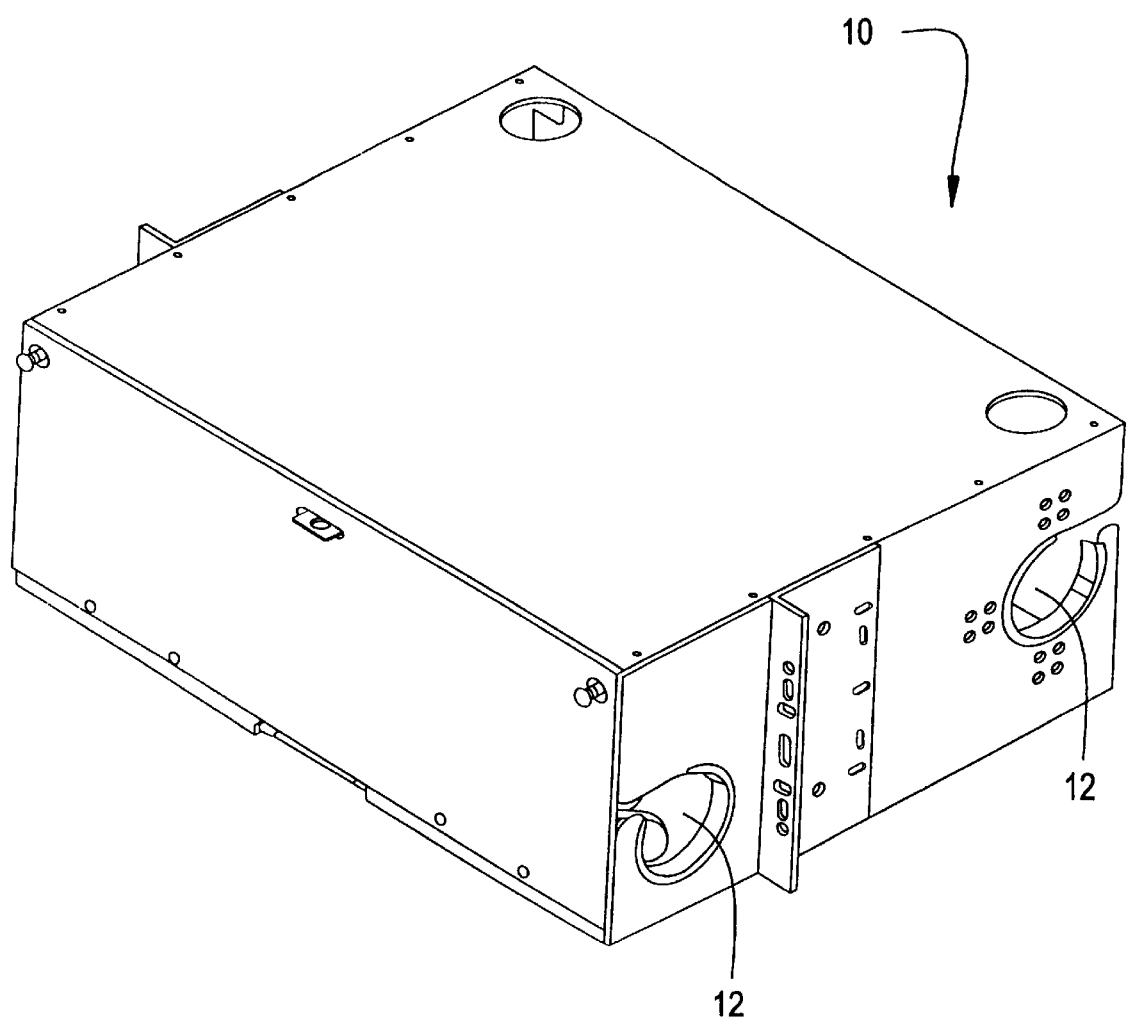
FIG. 1 is a perspective view of a cable distribution enclosure of the prior art.
Figure 2:
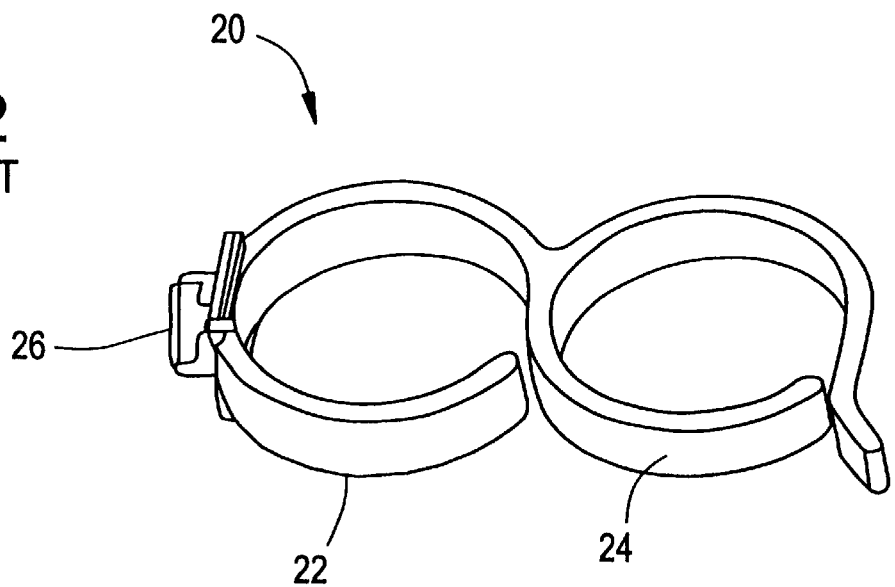
FIG. 2 is a perspective view a cable retainer of the prior art.
Figure 3:
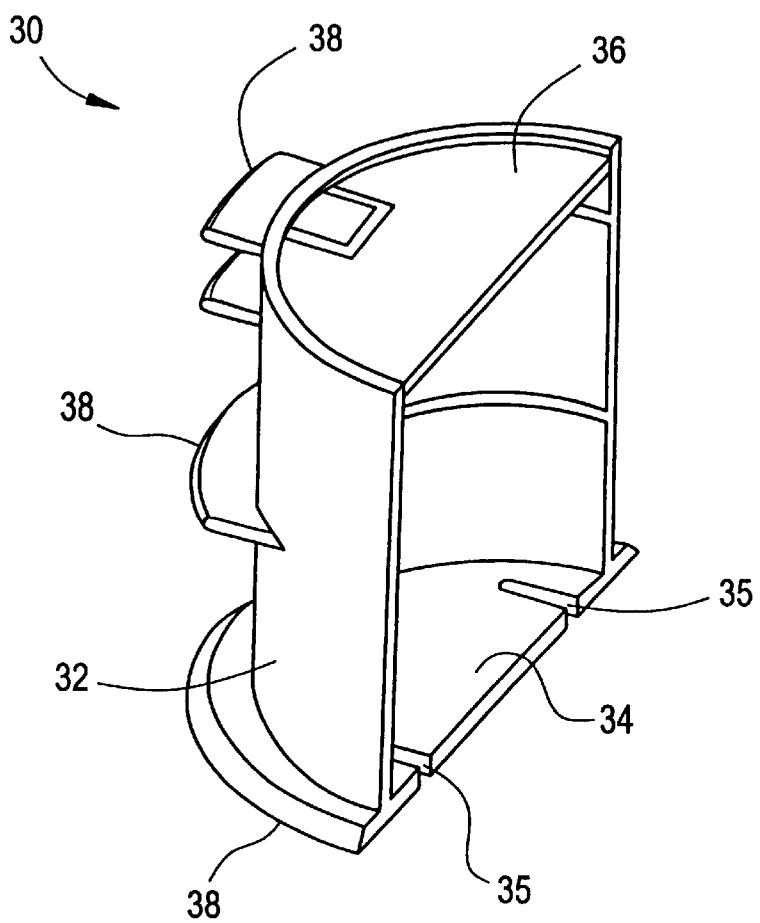
FIG. 3 is a perspective view of a bend radius device of the prior art.
Figure 4:
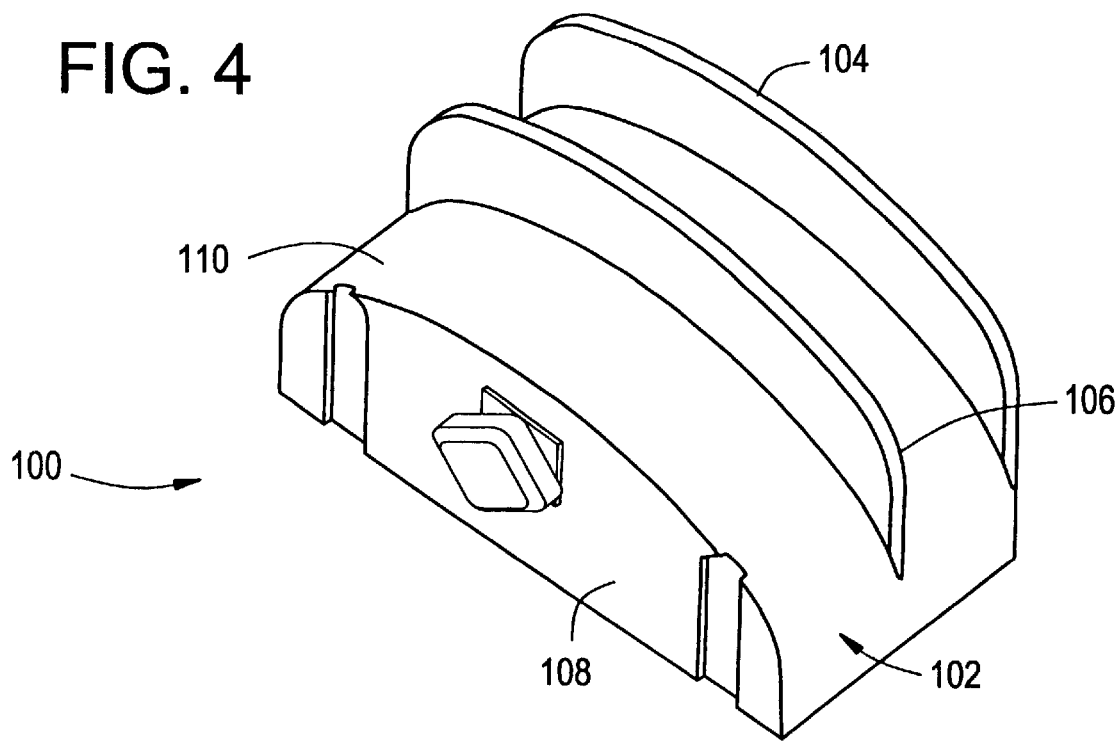
FIG. 4 is a perspective view of a stackable bend radius guide in one embodiment of the present invention.

FIG. 4 depicts a perspective view of a preferred embodiment of a stackable bend radius guide 100 in accordance with the present invention. Stackable bend radius guide 100 includes a bend member 102, a first flange 104, a second flange 106, and an end member 108.

Figure 5:
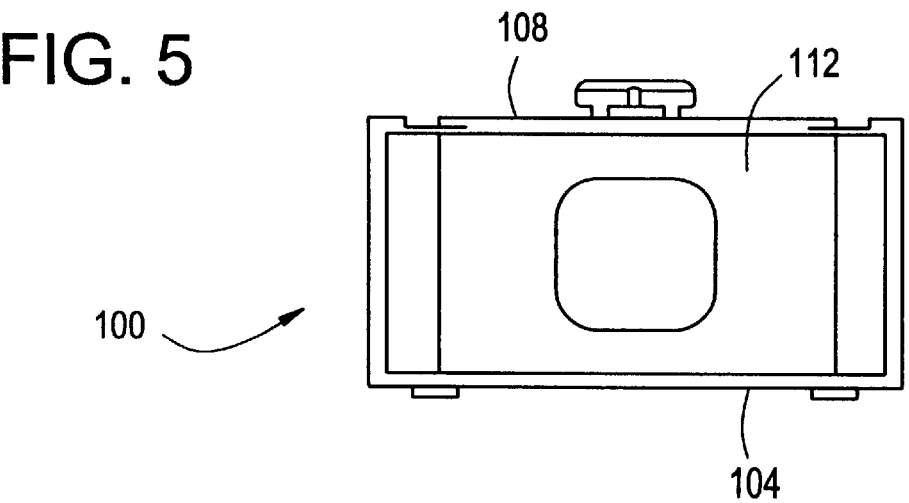
FIG. 5 is a bottom elevation view of the stackable bend radius of FIG. 4.

Bend member 102 comprises an outer surface 110 and an inner surface 112 (see FIG. 5). Outer surface 110 is substantially arcuate in shape with a prescribed radius so as to provide bend radius control and protection against the microbending of a fiber optic cable traversing said outer surface 110. Inner surface 112 of bend member 102 is concave in shape and may be congruent to outer surface 110.

First flange 104 may be a planar member substantially semi-circular in shape with a guide edge 114 and a facing edge 116.

Figure 6:
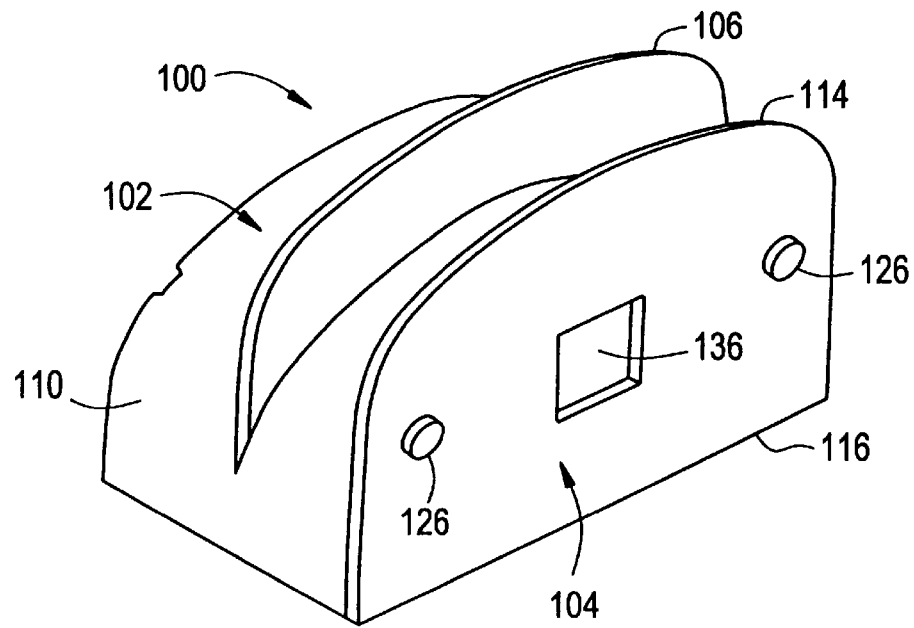
FIG. 6 is another perspective view of the stackable bend radius guide of FIG. 4.

Referring to FIG. 6, guide edge 114 is arcuate in shape and may be congruent to outer surface 110 of bend member 102. Guide edge 114 may be beveled to facilitate reception of fiber cables in the utilization of stackable bend radius guide 100, as described herein.

Facing edge 116 of first flange 104 is substantially straight and is directed toward the facing edge of an opposing second stackable bend radius guide when mounted in conjunction with stackable bend radius guide 100 of FIG. 4, according to one embodiment of the present invention.

First flange 104 is disposed perpendicular to the bend member 102 such that first flange 104 extends circumferentially beyond outer surface 110 of bend member 102 a prescribed distance to provide cable retention.

Referring again to FIG. 6, first flange 104 further includes an opening 136 and a plurality of protuberances 126.

Opening 136 is fashioned to receive a quarter turn fastener 118. Opening 136 may be similar in shape to quarter turn fastener 118 and of a size sufficient to receive and retain said quarter turn fastener during the stacking of stackable bend radius guides 100.

The protuberances 126 are raised members of a prescribed size to be received in a plurality of guide channels 124 during the mating of stackable bend radius guides 100. In one embodiment, two protuberances 126 are disposed in a line parallel to facing edge 116 of first flange 104 such that each protuberance 126 is on opposite sides of opening 136 equidistant from said opening.

Referring again to FIG. 4, second flange 106 is a planar member and is disposed parallel to first flange 104 on bend member 102 a prescribed distance from first flange 104.

Figure 9:
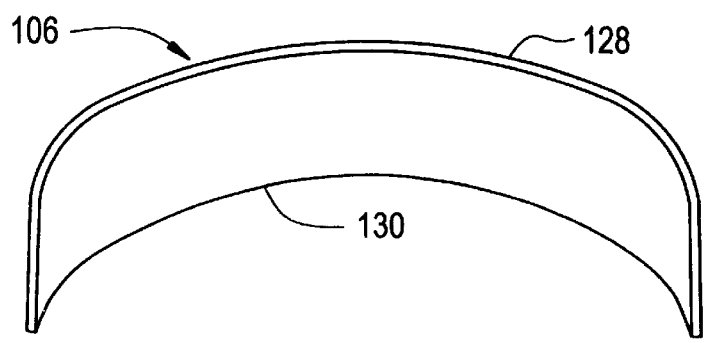
FIG. 9 is an elevation view of a second flange of the stackable bend radius guide of FIG. 4.

Referring now to FIG. 9, second flange 106 is substantially crescent shaped with a convex edge 128 and a concave edge 130. Concave edge 130 is fixed to bend member 102. Convex edge 128 maybe similar in shape to the outer surface 110 of bend member 102 and/or to guide edge 114 of first flange 104.

Referring again to FIG. 4, end member 108 is a planar member semi-circular in shape. End member 108 is mounted to stackable bend radius guide 100 perpendicular to the longitudinal axis of bend member 102 and parallel to the first flange 104.

Figure 7:
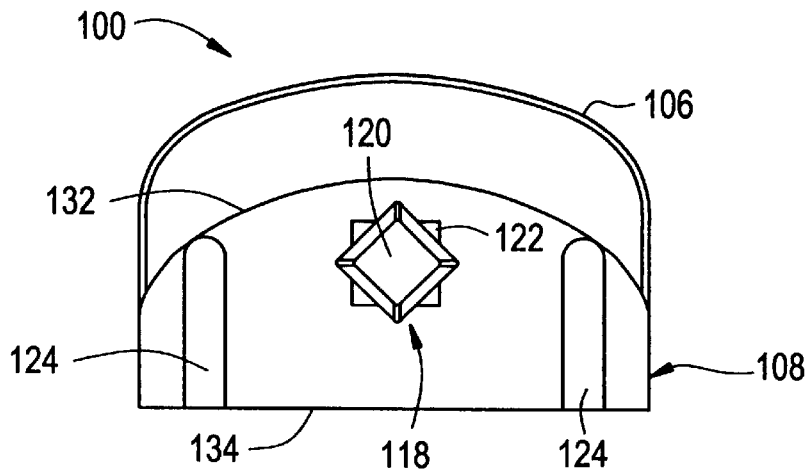
FIG. 7 is a front elevation view of the stackable bend radius guide of FIG. 4.

Referring now to FIG. 7, end member 108 includes an upper edge 132 and a bottom edge 134. The upper edge 132 is arcuate in shape and is congruent to outer surface 110 of bend member 102. Upper edge 132 of end member 108 is fixed to edge of bend member 102 opposite first flange 104. Bottom edge 134 is disposed parallel to facing edge 116 of first flange 104.

End member 108 also includes a quarter turn fastener 118. Quarter turn fastener 118 comprises a lock member 120 and a mounting member 122. Lock member 120 is rectilinear in shape and, in one embodiment is square. Lock member 120 is disposed atop mounting member 122. Mounting member 122 is rectilinear in shape and, in one embodiment, said member is square. Mounting member 122 is disposed on end member 108 such that an edge of said mounting member 122 is parallel to bottom edge 134 of first flange 104. Lock member 120 may be fixed on mounting member 122 at a forty-five degree angle, i.e., a quarter turn, relative to the disposition of mounting member 122 such that the corners of lock member 120 extend beyond mounting member 122 thereby forming a lock groove 123 (see FIG. 8).

Figure 8:
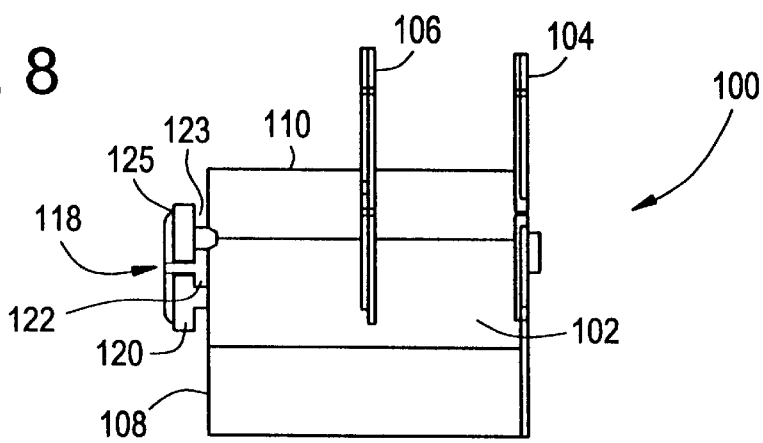
FIG. 8 is a side elevation view of the stackable bend radius guide of FIG. 4.

Referring now to FIG. 8, lock member 120 includes a beveled edge 125 for facilitating the receiving and locking of a second stackable bend radius guide, as is discussed herein.

Referring again to FIG. 7, end member 108 further includes a plurality of recesses 124. Recesses 124 may be detents shaped as longitudinal channels, circles, squares, or any cut-out shape suitable for a particular application of stackable bend radius guide 100.

In one embodiment of the present invention, two recesses 124 are disposed on either side of quarter turn fastener 118. Recesses 124 comprise rectilinear cut-out channels of sufficient depth and length to receive protuberances 126 in the stacking process, as discussed herein. Channeled recesses 124 are disposed perpendicular to bottom edge 134 of end member 108. In one embodiment, there are an equivalent number of protuberances 126 and guide channels 124 on stackable bend radius guide 100.

It will be appreciated that stackable bend radius guide 100 may further comprise a plurality of additional flanges similar to first flange 104 and/or second flange 106 disposed on bend member 102 as a particular application of the device, in accordance with the present invention, requires.

Flanges 104 and 106 guide the fiber optic cables along bend radius guide 100. The flanges have been described as planar members extending from bend member 102. In another embodiment of the present invention may be raised contours formed atop bend member 102. In still another embodiment, bend member may include detents or grooves for directing the cables across bend radius guide 100.

Bend radius guide 100 is made of plastic or any material suitable for the uses thereof and cabling applications discussed herein.

Bend member 102, as mentioned, is arcuate in shape. Bend member 102 is curved so as to allow safe passage of cables over bend radius guide 100 in varying cabling applications. The radius of curvature of bend member 102 is predetermined to correspond with the cables to be used in conjunction with the bend radius guide. Bend member 102 is curved at a radius of curvature which prevents the cables passing thereupon to bend at a radius of curvature less than a minimum bend radius for the particular cables.

The use of the device in accordance with the present invention will now be discussed.

Stackable bend radius guide 100 may be used in a variety of cable management settings to facilitate storage and distribution of a plurality of fiber cables while preventing minimum bend radius violations and microbending and the deleterious attenuation effects thereof. Stackable bend radius guide 100 may be used in any fiber cable enclosure, rack, connect panel, etc. that is fitted to receive a quarter turn fastener.

Figure 10:
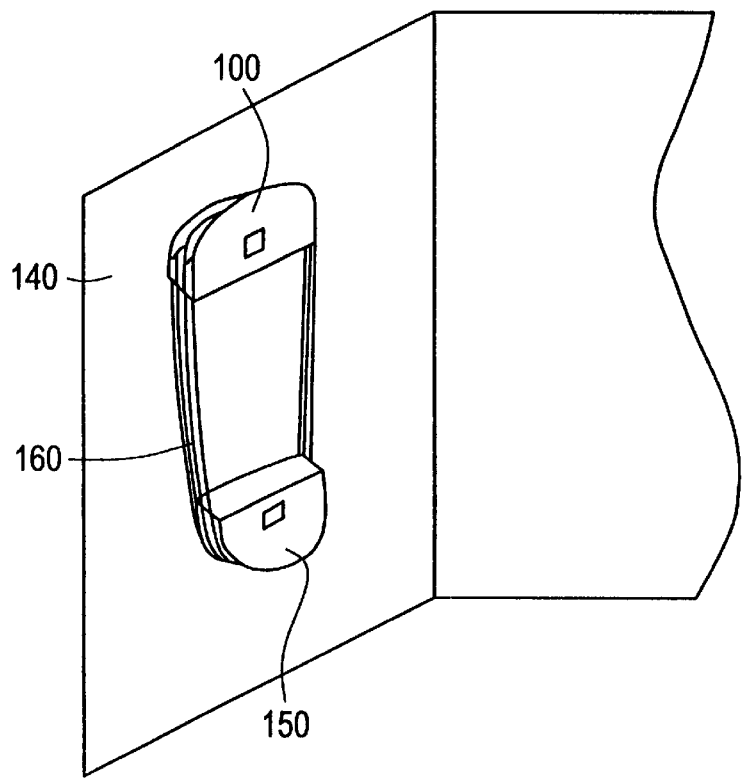
FIG. 10 is a perspective view of stackable bend radius guides in one embodiment of the present invention.
Figure 11:
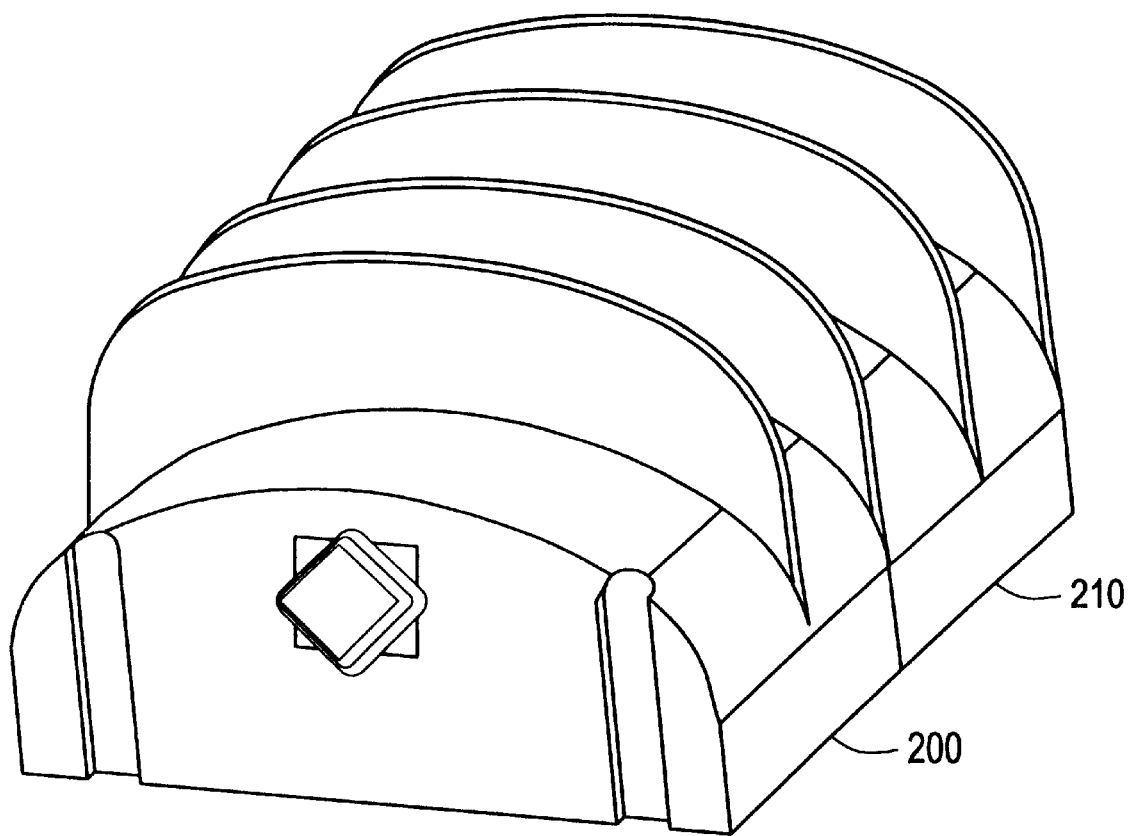
FIG. 11 is an elevational view of stacked bend radius guides in one embodiment of the present invention.

FIG. 10 shows perspective view of stackable bend radius guide 100 and a second stackable bend radius guide 150 mounted on a cable enclosure 140 in one embodiment of the present invention. Cable enclosure 140 includes openings (not shown) for receiving the quarter turn fasteners of stackable bend radius guides 100 and 150. Guides 100 and 150 are secured into place by utilizing the quarter turn locking method discussed herein below. Guides 100 and 150 are disposed such that respective end members 108 are flush against enclosure 140 and respective facing edges 116 and lower edges 134 of guides 100 and 150 are appositioned and parallel. A plurality of fiber cables 160 are wound about stackable bend radius guides 100 and 150 such that cables 160 traverse outer surface 110 of bend member 102 of guides 100 and 150. Cables 160 may be disposed on bend member 102 of respective guides 100 and 150 between first flange 104 and second flange 106 or between second flange 106 and the wall of enclosure 140, depending on the needs of a particular cabling application.

The mounting of bend radius guides 100 and 150, in one embodiment of the present invention as depicted in FIG. 10, is now described.

Quarter turn fastener 118 is brought at a forty-five degree angle into contact with opening 136 of enclosure 140 such that lock member 120 of quarter turn fastener 118 is received by opening 136. Guide 100 is then turned forty five degrees, one-quarter turn, until the guide snaps into place. The mating of protuberances 126 with recesses 124 ensure proper alignment of guides 100 and 150 and prevent unwanted movement of said guides during usage. The quarter turn revolution described above drives the material with which guide 100 is being mated into groove 123 of the quarter turn fastener, firmly securing the guide. Enclosure 140 may also include recesses 124 for receiving protrusions 126 when guides 100 and 150 are mounted to said enclosure 140.

Cables 160 may be of a volume or a density which requires a greater outer surface than that provided by bend member 102 of a single stackable bend radius guide 100. In accordance with the present invention, a plurality of guides may be mated to increase the available bend surface area for a particular cable management application. The mating of a plurality of bend radius guides is accomplished by securing quarter turn fastener 118 of a stackable bend radius guide 200 to opening 136 of a second stackable bend radius guide 210 by utilizing the quarter turn mating technique discussed herein above. A plurality of bend radius guides may be mated with the stacked bend radius guides 200 and 210 to provide addition bend surface area for cables 160 as required per specific cabling application.

The present invention provides a device using an arcuate surface and a plurality of guide flanges to direct fiber cables so as to prevent microbending and minimum bend radius violations within a cable management system. The device, in one embodiment, includes both a quarter turn fastener and an opening for receiving quarter turn fasteners. In this way one bend radius guide may mate with a plurality of bend radius guides, combining to provide a desired bend surface area required for a particular cabling application. The quarter turn fastener further allows for ease of installation and disassembly by requiring no tools and no mounting or attachment hardware.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A device for guiding and protecting cable comprising:
   a bend member having a bend surface, said bend surface allowing passage of a cable, said bend surface having a radius preventing said cable from bending to a radius less than a minimum bend radius;
   at least one guide member located on said bend member, said guide member directing said passage of said cable;
   fastening means secured to said bend member for selectively and releasably attaching said device to a similar device, said fastening means engaging an opening in said similar device.

2. A device according to claim 1 wherein said bend surface is an arcuate surface and said guide member is disposed on said arcuate surface in a direction of said passage of said cable.

3. A device according to claim 2 wherein said guide member is a flange, said flange extending perpendicularly from said arcuate surface forming a collar for retaining said cable.

4. A device according to claim 1 wherein said fastening means includes a quarter turn fastener located at a first end of said device.

5. A device according to claim 4 wherein said fastening means further includes an opening formed at a second end of said device, said second end being located opposite said first end, said opening for receiving and releasably retaining another quarter turn fastener.

6. A device according to claim 1 further comprising securement features separate from said fastening means for facilitating said attaching.

7. A device according to claim 1 wherein said at least one guide member includes a first guide member located on the bend surface at a first end of said device and a second guide member located on the bend surface between said first end and a second end of said device wherein said second end is opposite said first end.

8. A device according to claim 7 wherein said first guide member is a first flange member and said second guide member is a second flange member and wherein said first and second flange members extend radially from said bend surface and traverse a direction of said passage of said cable, said first and second flange members retaining said cable on said device and guiding said cable across said device.

9. A device for guiding and protecting cables comprising:
   a bend member having a bend surface, said bend surface configured, dimensioned and positioned to allow passage of a cable and to prevent said cable from bending according to a radius less than a minimum bend radius;
   at least one guide member located on said bend member, said guide member directing said passage of said cable;
   fastening means for selectively and releasably attaching said device to a similar device; and, a securement feature for facilitating said attaching and said mounting;

wherein said securement feature include at least one slot at a first end of said device wherein said slot releasably retains a protuberance, said securement feature further including a further protuberance at a second side of said device wherein said second side is opposite said first side.

10. A device for guiding and protecting cables comprising:

a bend member having a bend surface, said bend surface configured, dimensioned and positioned to allow passage of a cable and to prevent said cable from bending according to a radius less than a minimum bend radius;

at least one guide member located on said bend member, said guide member directing said passage of said cable;

fastening means for selectively and releasably attaching said device to a similar device and for selectively and releasably mounting said device within a cabling system;

wherein said fastening means includes a fastener member disposed on a first end of said device, said fastener member formed and disposed on said first end for reception by and retainment in an aperture, said aperture being formed in said similar device for said attaching or said aperture being formed in said cabling system for said mounting;

wherein said fastener member includes a block member mounted on a base, said base mounted to said first end, said block member being larger in size than said base such that a groove is formed between said block member and said first end.

11. A device according to claim 10 wherein said block member is square and is disposed at an angle on said first end to facilitate said mounting, said block member including beveled edges.

12. A device for providing bend radius protection for cables in a cable distribution or management system, the device comprising:

an arcuate member of radius greater than or equal to a minimum bend radius of said cables, a plurality of flanges disposed on said arcuate member perpendicular to a longitudinal axis of said arcuate member, a fastener, an opening for receiving a further fastener on a similar device, and a recess for receiving a protuberance on the similar device.

13. Apparatus for guiding and protecting cable comprising:

a first device having:

a first bend member having a first bend surface, said first bend surface allowing passage of a cable, said first bend surface having a radius preventing said cable from bending to a radius less than a minimum bend radius; a first guide member located on said first bend member, said first guide member directing said passage of said cable;

a second device having:

a second bend member having a second bend surface, said second bend surface allowing passage of a cable, said second bend surface having a radius preventing said cable from bending to a radius less than a minimum bend radius;

a second guide member located on said second bend member, said second guide member directing said passage of said cable;

said first device having a fastening means secured to said bend member;

said second device having an opening for receiving said fastening means for attaching said first device to said second device.

14. The apparatus of claim 13 further comprising:

a securement feature for facilitating attachment of said first device and said second device.

15. The apparatus of claim 14 wherein:

wherein said securement feature includes a slot on one of said first device and said second device and at protuberance on another of said first device and said second device, said slot releasably retaining said protuberance.

16. The apparatus of claim 13 wherein:

said fastening means in integrally formed with said bend member.

* * * * *